Figure 1:
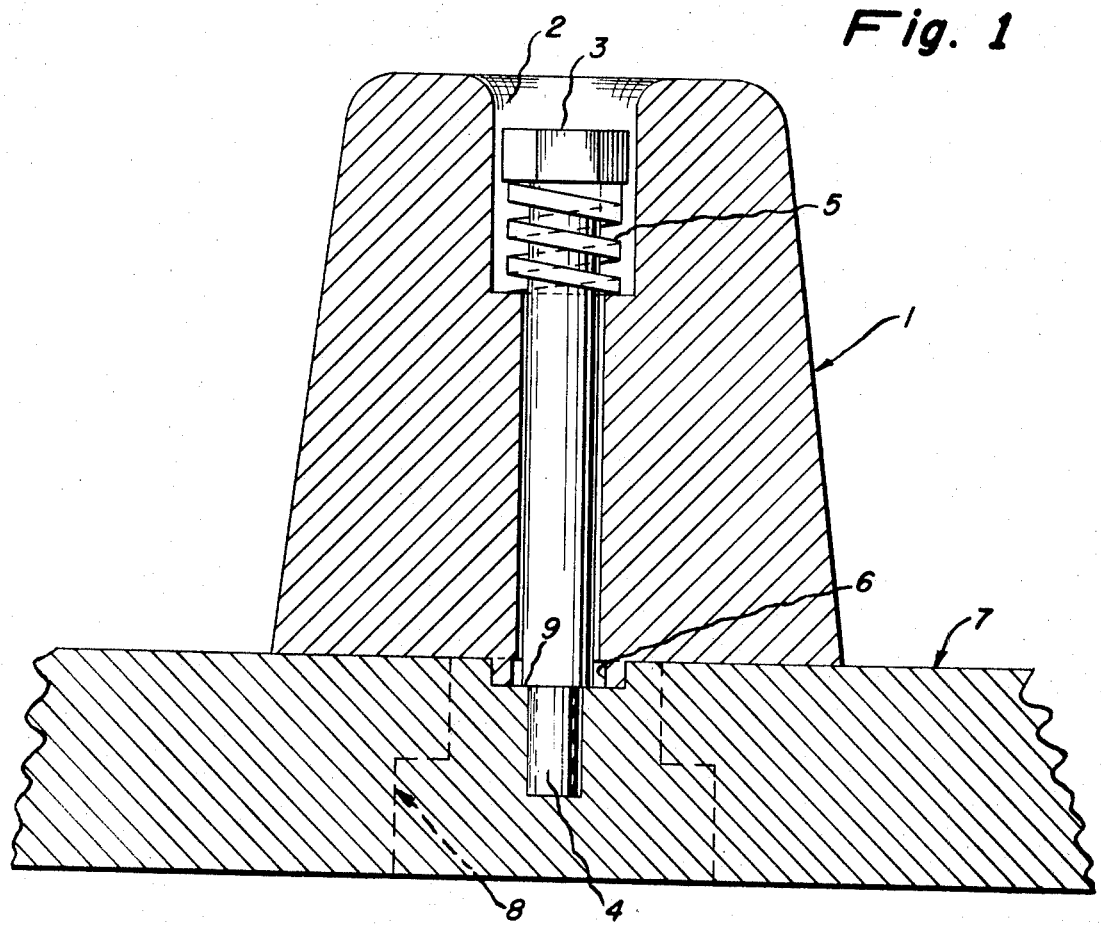

United States Patent [19]
Neil

[11] 3,740,178
[45] June 19, 1973

[54] PLUG ASSEMBLY FOR THERMOFORMING
[75] Inventor: Peter C. Neil, Fullerton, Calif.
[73] Assignee: Standard Oil Company, Chicago, Ill.
[22] Filed: Apr. 21, 1971
[21] Appl. No.: 135,853

[52] U.S. Cl. ............ 425/182, 249/64, 249/177, 425/468, 425/472
[51] Int. Cl. ............................................ B29c 1/16
[58] Field of Search .......... 425/182, 384, 472, 425/468, 450; 249/155, 177, 176, 63–68, 205; 164/280, 397

[56] References Cited
UNITED STATES PATENTS
2,968,855   1/1961   Stolz .......................... 249/177 X
3,587,144   6/1971   Mechling ..................... 249/66 X
3,228,071   1/1966   Schultz ........................ 164/280
3,528,487   9/1970   Wognum et al. ............. 164/280
3,650,653   3/1972   Erickson ...................... 425/450
3,132,381   5/1964   Bowen ......................... 425/182

Primary Examiner—Robert L. Spicer, Jr.
Attorney—Arthur G. Gilkes, William T. McClain and Ralph C. Medhurst

[57] ABSTRACT

A novel plug assembly for use in thermoforming of plastics comprises a combination of a plug body made of a relatively highly heat-conductive material fitted with holding means passing therethrough made from a high tensile strength material, said holding means and said plug body being spaced from one another by a self-adjusting spacing member providing compensation for thermal expansion and contraction.

4 Claims, 4 Drawing Figures

Patented June 19, 1973　　　　3,740,178

2 Sheets-Sheet 1

INVENTOR.
Peter C. Nell

BY R.C. Medhurst
ATTORNEY

Patented June 19, 1973

3,740,178

2 Sheets-Sheet 2

INVENTOR.
Peter C. Neil

BY R.C. Medhurst
ATTORNEY

PLUG ASSEMBLY FOR THERMOFORMING

BACKGROUND OF THE INVENTION

In the field of thermoforming plastics it is well-known to use plug assisted molding techniques wherein a platen having mold cavity conforming to the shape of a desired article is matched with a plug attached to a second platen, such plug fitting loosely within the mold cavity. The plug helps to displace a sheet of softened plastic material held between the two platens from normally generally horizontal configuration into a configuration conforming generally to the shape of the mold cavity. Plugs can be used singly or in multiples of units made integrally as part of an upper platen, or they can be individually attached to a flat platen so as to provide a desired configuration nesting into multiple lower mold cavities.

It is advantageous that multiple plugs be individually replaceable. This has been accomplished in the art by means of bolts recessed into the top of the plugs and extending longitudinally through the plugs into a mounting plate and by such means as mounting lugs, extending from the base of the plug into a mounting plate, such lugs providing points for affixing bolts passed through the mounting plate. The plugs are generally made of a highly heat-conducting material, such as aluminum, in order that a mold can be quickly cycled through its heating and cooling periods and allow the greatest possible productivity from a given molding machine. It is necessary that the bolts used to retain plugs be made of a high tensile material because of the great forces involved in thermoform molding. As a consequence, the retaining bolts are generally made of a high tensile strength steel. During the rapid heating and cooling cycles encountered in a thermoforming operation and as a consequence of simple thermal expansion and contraction or of the differences in thermal expansion between steel and aluminum, or other pairs of materials each having the requisite properties for its application, retaining bolts will gradually come loose from their mountings, allowing the plugs to shift and necessitating frequent shutdowns for bolt tightening. In the event the retaining bolts are not kept tight, the plugs will gradually continue to loosen until they may drop off completely or enter the lower mold cavity at such an angle as to cause severe mold damage.

SUMMARY OF THE INVENTION

My invention comprises a novel and improved plug assembly which has the advantages of allowing extended periods of thermoforming machine usage without shutdown for tightening of retaining bolts. Further, my invention provides for a plug made from a desirably highly heat-conductive material to be firmly affixed to a platen by a retaining bolt made from a desirably high tensile strength material. At the same time, my novel plug assembly avoids problems associated with plug assemblies known heretofore to the thermoforming art. It is likely to be advantageous to use a non-heated plug in thermoforming rather than a plug which goes through alternate heating and cooling cycles but any non-heated plug would have to have essentially zero heat capacity to avoid removal of heat from a warmed sheet of plastic ready for a thermoforming operation. An approximation of such a material is achieved in the use of compacted felt plugs but these have the disadvantage of a relatively short useful life. My invention could be employed with such plugs but it is illustrated herein in association with the relatively long life heat conductive plugs. The plug assembly of my invention can be used in all types of thermoforming, including straight vacuum forming, drape vacuum forming, vacuum snap-back forming, plug and ring forming, air-pressure forming, matched metal mold forming, billow forming and the like, as will be understood from the description set forth hereinafter.

Figure 2:
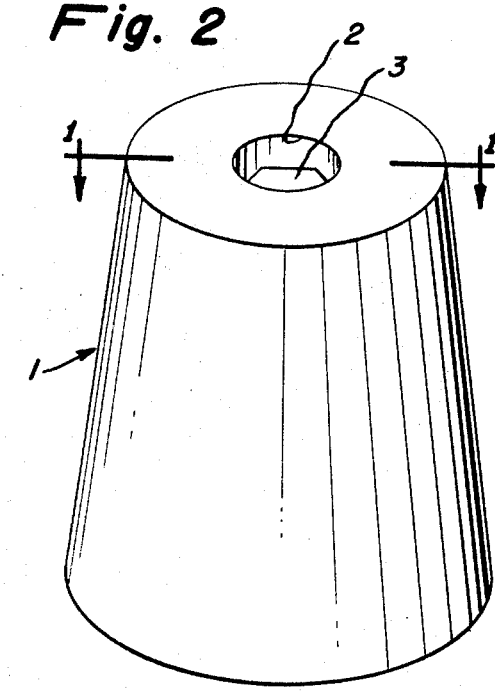
Figure 3:
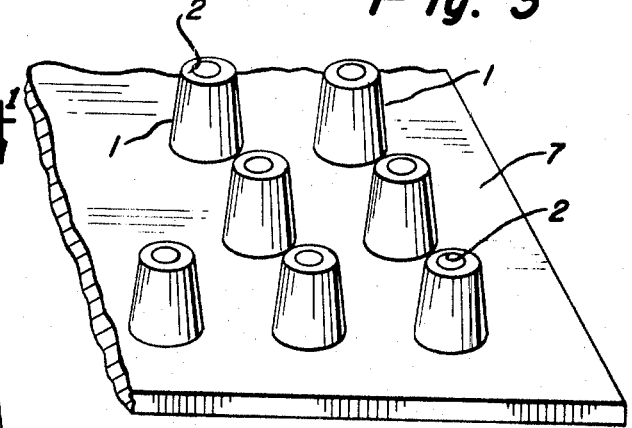

The plug assembly which is my invention is depicted in the drawing by FIG. 1, showing a cross-section of a single plug of a type which can typically be used in the formation of thermoformed cups. FIG. 2 is a perspective of a complete plug assembly. FIG. 3 illustrates how multiples of such plugs can be used together when mounted to a platen. The details of construction of such plugs, by turning from metal blocks, casting or compression molding from metal powder followed by sintering, are known to the molding art and will not be discussed here. Any of the usual techniques of the art may be employed.

In FIG. 1, plug body 1, made from a highly heat-conductive material such as aluminum, is provided with a recess 2 in which retaining bolt 3 can be fitted. The threaded end 4 of retaining bolt 3 can be fixed into a suitably screw-threaded hole in a platen, such platen being desirably provided with heat exchange elements whereby heat can be passed by conduction to or from plug body 1. A typical platen 7 is shown in FIGS. 1 and 3. When the platen is made of aluminum, it is desirable, in order to extend its life, to fasten retaining bolt 3 into a steel insert 8. If the mounting plate is made of steel, the retaining bolt can be fixed into a screw-threaded hole made directly into the platen. Beneath the head of retaining bolt 3 is a difficultly compressible spring 5 which spaces the head of retaining bolt 3 from the bottom of receptacle 2 in plug body 1. Retaining bolt 3 is desirably equipped with a shoulder 9 so that the amount of compression upon spring 5 can be closely controlled. Plug body 1 is desirably provided with a projection 6 matched to a mounting hole in a platen so that the proper positioning of multiple plug bodies on a platen can be readily accomplished without the necessity of measurement of spacing positions. One or more of such aligning means may be employed. The plug body is desirably coated on its external surface with a Teflon coating to ensure that the material being thermoformed will not adhere to the plug body. Other coating techniques, such as metal plating or anodizing may be used but are not a part of my invention.

In use, multiples of plug bodies such as described above are mounted to a platen 7 as shown in FIG. 3 and the retaining bolt of each plug body is adjusted by a torque wrench to a desired tension. Referring again to FIG. 1, such torquing compresses spring 5 causing plug body 1 to be maintained in tight contact with a platen. In use, during heating and cooling cycles in which the plug body and the retaining bolt expand to different amounts, spring 5 compensates for differences in expansion so that there is no tendency for retaining bolt 2 to work loose from the platen. This provides a considerable advantage by reduction of molding machine down time as compared to the techniques of mounting separable plug bodies on platens known to the prior art.

Figure 4:
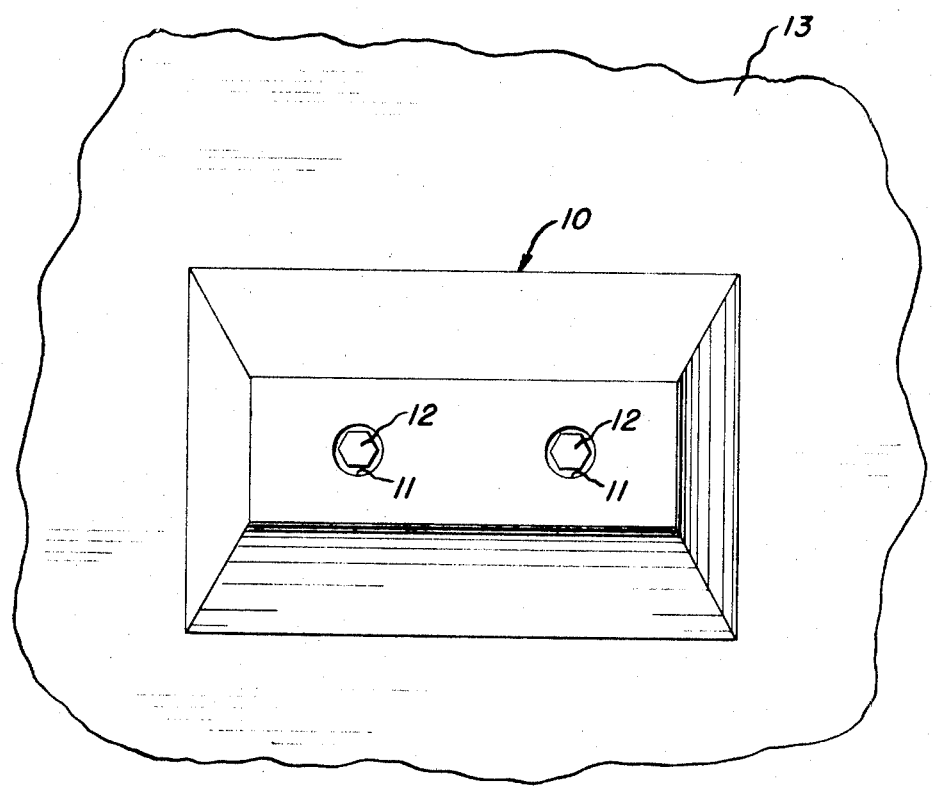

The plug assembly depicted in plan view in FIG. 4 is another illustration of the application of my invention wherein a plug of complex shape is affixed to a mounting plate with two retaining bolts, each of which is fitted with a spring functioning in the same manner as in the embodiment which is FIG. 1. In FIG. 4 there is illustrated a plug body 10 having two recesses 11 through which two retaining bolts 12 are affixed into platen 13. The spacing springs are not shown in the figure but are mounted in the same manner as illustrated by FIG. 1. Even more complex molds can be conveniently and usefully mounted with additional retaining bolts, all in accordance with the practice of my invention. In a typical application wherein a complex mold having a base area of about 12 square inches is to be fixed to a mounting plate by two retaining bolts, I would employ a spring requiring 300 pounds of pressure for each one-eighth inch of compression and would use a 1 inch high spring. Thus, the two springs could be compressed one-fourth inch each and generate 1,200 pounds of total pressure, which I have found to be adequate for retaining a plug. In general, 100 pounds per square inch will be found to be suitable for holding a plug firmly to a mounting plate though greater or lesser pressures may be used, if desired. The calculation of the base area of plugs, the strength of the spring to be used and the amount of compression of that spring necessary to achieve a desired retaining force can be readily calculated as I have done this hereinbefore.

The plug bodies of my invention are not necessarily made of aluminum but are desirably made of any relatively highly heat-conductive material. The retaining bolts for the plug bodies are not necessarily made of steel but are desirably made of a material having a high tensile strength. The spring which spaces the retaining bolt head from the plug body in my novel plug assembly should have a compressive strength which will exert a force within the range of 50 psi (pounds per square inch) to 150 psi though other values may be desirable for particular applications. A retaining force of 75 psi to 125 psi is particularly useful and convenient. We have found that when using a Teflon coated aluminum plug body in the from of a truncated cone having a base diameter of 4 inches, a top diameter of 3 inches, and a total height of 4 inches it is desirable to have a retaining bolt recess with a depth of 1.5 inches and to use a retaining bolt of 4.0 inches length which can be threaded 0.75 inches into a platen. The spacing spring is desirably 1.0 inches in length with a compressive strength of 300 pounds per one-eighth inch and the retaining bolt is torqued into the platen with a force of 100 foot pounds. The spring, compressed one-quarter inch in this assembly, provides a total retaining force of 600 pounds. In the event it is desirable to pass air through the plug during a thermoforming operation, the plug can be made of a sintered metal porous to air flow and the mounting plate can be equipped with channels leading air to the plug.

Having thus described my invention, what I claim is:

1. A plug assembly for thermoforming comprising a plug body of a relatively higher heat-conductive material as compared to an associated retaining bolt, said body having at one end a recess communicating with a passage extending longitudinally through said body and in said passage said retaining bolt, of a relatively higher tensile strength and lower heat-conductive material as compared to said body, having a threaded end projecting beyond a base portion of said body and adapted for mounting said body to a platen, the head of said retaining bolt being within the recess in said body and spaced from said body by a spring.

2. The plug assembly of claim 1 wherein said base portion of said body is fitted with aligning means for alignment of said body with said platen.

3. The plug assembly of claim 2 wherein said aligning means consist of one or more projections adapted to match with one or more recesses in said platen.

4. The plug assembly of claim 3 wherein said plug body is aluminum and said retaining bolt is steel.

* * * * *